US011879656B2

(12) United States Patent
Hurley et al.

(10) Patent No.: US 11,879,656 B2
(45) Date of Patent: Jan. 23, 2024

(54) INITIALIZATION OF RADIAL BASE FUNCTION NEURAL NETWORK NODES FOR REINFORCEMENT LEARNING INCREMENTAL CONTROL SYSTEM

(71) Applicant: INTERNATIONAL BUSINESS MACHINES CORPORATION, Armonk, NY (US)

(72) Inventors: Steven Hurley, Denton, TX (US); Brody Wilson, Niwot, CO (US); Donald McCleary, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 1549 days.

(21) Appl. No.: 15/944,936

(22) Filed: Apr. 4, 2018

(65) Prior Publication Data
US 2019/0309979 A1 Oct. 10, 2019

(51) Int. Cl.
F24F 11/65 (2018.01)
G05B 13/02 (2006.01)
(Continued)

(52) U.S. Cl.
CPC ............. F24F 11/65 (2018.01); F24F 11/49 (2018.01); F24F 11/58 (2018.01); F24F 11/64 (2018.01);
(Continued)

(58) Field of Classification Search
CPC .. F24F 11/49; F24F 11/58; F24F 11/64; F24F 11/65; F24F 11/67; G06N 3/0481; G06N 3/08; G06F 17/16; G05B 13/027
See application file for complete search history.

(56) References Cited

U.S. PATENT DOCUMENTS 5,608,843 A * 3/1997 Baird, III ........... G05B 13/0265
706/23
5,847,952 A * 12/1998 Samad ................. G05B 13/027
700/48
(Continued)

FOREIGN PATENT DOCUMENTS

CN 102830625 A 12/2012
CN 105629721 A * 6/2016 ........... G05B 13/027
(Continued)

OTHER PUBLICATIONS

Chng, E. S., Sheng Chen, and Bernard Mulgrew. "Gradient radial basis function networks for nonlinear and nonstationary time series prediction." IEEE transactions on neural networks 7.1 (1996): 190-194. (Year: 1996).*

(Continued)

Primary Examiner — Robert E Fennema
Assistant Examiner — Vi N Tran
(74) Attorney, Agent, or Firm — CANTOR COLBURN LLP; Tihon Poltavets

(57) ABSTRACT

According to one or more embodiments of the present invention, a computer-implemented method for adjusting a process variable using a closed loop system includes initializing a radial basis function neural network (RBF network) using a maximum error ($e_{max}$), a maximum first order change in error ($\Delta e_{max}$), a maximum second order change in error ($\Delta^2 e_{max}$), and a maximum output increment ($\Delta o_{max}$), associated with the closed loop system being controlled. The method further includes inputting, to the RBF network, input values including an error, a first order change in error, and a second order change in error. The method further includes computing, by the RBF network, control parameters based on the input values, and computing, by the RBF network, an incremental change in the process variable based on the control parameters. The method further includes adjusting, (Continued)

by a controller, an output device to change the process variable by the incremental change.

20 Claims, 6 Drawing Sheets

(51) Int. Cl.
  *G06F 17/16* (2006.01)
  *F24F 11/67* (2018.01)
  *F24F 11/58* (2018.01)
  *F24F 11/64* (2018.01)
  *F24F 11/49* (2018.01)
(52) U.S. Cl.
  CPC ............ *F24F 11/67* (2018.01); *G05B 13/027* (2013.01); *G06F 17/16* (2013.01)

(56) References Cited

U.S. PATENT DOCUMENTS

| | | | | |
|---|---|---|---|---|
| 6,243,696 | B1 * | 6/2001 | Keeler | G06N 3/047 |
| | | | | 706/907 |
| 6,847,954 | B1 * | 1/2005 | Wojsznis | G05B 13/0285 |
| | | | | 706/14 |
| 6,901,300 | B2 * | 5/2005 | Blevins | G05B 13/048 |
| | | | | 700/71 |
| 6,904,422 | B2 * | 6/2005 | Calise | G05B 13/027 |
| | | | | 706/23 |
| 7,395,251 | B2 | 7/2008 | Linsker | |
| 7,496,546 | B2 | 2/2009 | Hoya | |
| 7,769,703 | B2 * | 8/2010 | Calise | G05B 13/027 |
| | | | | 348/169 |
| 8,065,251 | B2 | 11/2011 | Mehta et al. | |
| 9,015,093 | B1 | 4/2015 | Commons | |
| 9,189,730 | B1 | 11/2015 | Coenen et al. | |
| 10,061,286 | B2 * | 8/2018 | Wojsznis | G05B 17/02 |
| 10,234,855 | B2 * | 3/2019 | Mariswamy | G05B 23/027 |
| 2003/0055797 | A1 * | 3/2003 | Ishihara | G06K 9/6273 |
| | | | | 706/18 |
| 2007/0168057 | A1 | 7/2007 | Blevins et al. | |
| 2009/0228251 | A1 * | 9/2009 | Cakmakci | G06T 17/30 |
| | | | | 703/2 |
| 2011/0231320 | A1 | 9/2011 | Irving | |
| 2013/0212049 | A1 | 8/2013 | Maldonado | |
| 2017/0185892 | A1 * | 6/2017 | Han | G01N 33/1806 |
| 2019/0187631 | A1 * | 6/2019 | Badgwell | G06N 3/006 |

FOREIGN PATENT DOCUMENTS

| | | | | |
|---|---|---|---|---|
| CN | 103853046 | B * | 10/2017 | |
| EP | 2703914 | A1 | 5/2014 | |
| GB | 2580008 | A * | 7/2020 | ......... G05B 23/0224 |

OTHER PUBLICATIONS

Xu, Honghua, et al. "An intelligent PID controller on RBFNN." 2011 2nd International Conference on Artificial Intelligence, Management Science and Electronic Commerce (Aimsec). IEEE, 2011. (Year: 2011).*

Xie, Tiantian, et al. "Fast and efficient second-order method for training radial basis function networks." IEEE transactions on neural networks and learning systems 23.4 (2012): 609-619. (Year: 2012).*

Machine translation for CN 103853046 B, obtained Jun. 2022 (Year: 2022).*

Machine Translation for CN-105629721-A, obtained Nov. 19, 2022 (Year: 2022).*

Ferreira et al., "Neural networks based predictive control for thermal comfort and energy savings in public buildings", Elsevie, 2012 (see p. 242, col. 2, paras 1-5), pp. 1-14.

Sedighizadeh et al., "Adaptive PID Controller based on Reinforcement Learning for Wind Turbine Control," Proceedings of World Academy of Science, Engineering and Technology vol. 27, ISSN 1307-6884, Feb. 2008, pp. 1-6.

* cited by examiner

INITIALIZATION OF RADIAL BASE FUNCTION NEURAL NETWORK NODES FOR REINFORCEMENT LEARNING INCREMENTAL CONTROL SYSTEM

BACKGROUND

The present invention generally relates to computing technology, particularly artificial neural networks and pertains to initialization of Radial Base Function (RBF) neural network nodes that can be used for reinforcement learning incremental control system.

A Radial Basis Function (RBF) network is an artificial neural network that uses radial basis functions as activation functions. In a typical RBF network, an RBF node or neuron is responsible for determining the activation value of the node using multiple inputs to generate one output. RBF networks typically can only differentiate between normal and abnormal values.

SUMMARY

According to one or more embodiments of the present invention, a computer-implemented method for adjusting a process variable using a closed loop system includes initializing a radial basis function neural network (RBF network), the initialization using a maximum error ($e_{max}$), a maximum first order change in error ($\Delta e_{max}$), a maximum second order change in error ($\Delta^2 e_{max}$), and a maximum output increment ($\Delta o_{max}$), associated with the closed loop system being controlled. The method further includes inputting, to the RBF network, input values including an error, a first order change in error, and a second order change in error. The method further includes computing, by the RBF network, control parameters based on the input values. The method further includes computing, by the RBF network, an incremental change in the process variable based on the control parameters. The method further includes adjusting, by a controller, an output device to change the process variable by the incremental change.

According to one or more embodiments of the present invention, a control system for controlling a process variable of a closed loop system includes one or more sensors that measure the process variable. The control system further includes an output device that changes the process variable based on an input command. The control system further includes a controller that generates and sends the input command to the output device. Generating of the input command includes initializing a radial basis function neural network (RBF network), the initialization using a maximum error ($e_{max}$), a maximum first order change in error ($\Delta e_{max}$), a maximum second order change in error ($\Delta^2 e_{max}$), and a maximum output increment ($\Delta o_{max}$), associated with the closed loop system being controlled. Generating of the input command further includes inputting, to the RBF network, input values comprising an error, a first order change in error, and a second order change in error. Generating of the input command further includes computing, by the RBF network, control parameters based on the input values. Generating of the input command further includes computing, by the RBF network, an incremental change in the process variable based on the control parameters. Generating of the input command further includes adjusting the output device to change the process variable by the incremental change.

According to one or more embodiments of the present invention, a computer program product generates an input command for adjusting a process variable of a closed loop system. The computer program product includes a memory device with computer executable instructions therein, the instructions when executed by a processing unit generate the input command. Generating of the input command includes initializing a radial basis function neural network (RBF network), the initialization using a maximum error ($e_{max}$), a maximum first order change in error ($\Delta e_m$), a maximum second order change in error ($\Delta_2 e_{max}$), and a maximum output increment ($\Delta o_{max}$), associated with the closed loop system being controlled. Generating of the input command further includes inputting, to the RBF network, input values comprising an error, a first order change in error, and a second order change in error. Generating of the input command further includes computing, by the RBF network, control parameters based on the input values. Generating of the input command further includes computing, by the RBF network, an incremental change in the process variable based on the control parameters. Generating of the input command further includes adjusting the output device to change the process variable by the incremental change.

According to one or more embodiments of the present invention, a controller adjusts a process variable of a closed loop system to a set point. The adjustment includes initializing a radial basis function neural network (RBF network), the initialization using a maximum error ($e_{max}$), a maximum first order change in error ($\Delta e_{max}$), a maximum second order change in error ($\Delta^2 e_{max}$), and a maximum output increment ($\Delta o_{max}$), associated with the closed loop system being controlled. The adjustment further includes inputting, to the RBF network, input values including an error, a first order change in error, and a second order change in error. The adjustment further includes computing, by the RBF network, control parameters based on the input values. The adjustment further includes computing, by the RBF network, an incremental change in the process variable based on the control parameters. The adjustment further includes adjusting, by a controller, an output device to change the process variable by the incremental change.

According to one or more embodiments of the present invention, a control system for controlling a heat ventilating and air conditioning (HVAC) system is described. The control system includes a controller that generates and sends an input command to the HVAC system to adjust a temperature to a set point. Generating and sending of the input command includes initializing a radial basis function neural network (RBF network), the initialization using a maximum error ($e_{max}$), a maximum first order change in error ($\Delta e_{max}$), a maximum second order change in error ($\Delta^2 e_{max}$), and a maximum temperature increment ($\Delta o_{max}$), associated with the HVAC system being controlled. Generating and sending of the input command further includes inputting, to the RBF network, input values comprising an error, a first order change in error, and a second order change in error. Generating and sending of the input command further includes computing, by the RBF network, control parameters of the HVAC system based on the input values. Generating and sending of the input command further includes computing, by the RBF network, an incremental change in the temperature based on the control parameters, and adjusting a temperature setting of the HVAC system to change the temperature by the incremental change.

In one or more examples, the initialization includes initializing an RBF network weight matrix of the RBF network by scaling an initial weight vector ($\omega'$) so that an input vector including the maximum error ($e_{max}$), the maximum first order change in error ($\Delta e_{max}$), and the maximum second order change in error ($\Delta^2 e_{max}$) multiplied by a predetermined fraction generates the maximum temperature increment ($\Delta o_{max}$), wherein the error is a difference between the set point of the HVAC system and a measured temperature, the first order change in the error is a difference between the error and a previous error, and the second order change in the error is a difference between the first order change in the error and a previous first order change in the error.

In one or more examples, the initialization includes setting center vectors ($\mu$) of the RBF network using the maximum error ($e_{max}$), the maximum first order change in error ($\Delta e_{max}$), and the maximum second order change in error ($\Delta^2 e_{max}$) as:

$$\mu = \begin{bmatrix} e_{max} & \Delta e_{max} & \Delta^2 e_{max} \\ e_{max} & \Delta e_{max} & -\Delta^2 e_{max} \\ e_{max} & -\Delta e_{max} & \Delta^2 e_{max} \\ e_{max} & -\Delta e_{max} & -\Delta^2 e_{max} \\ -e_{max} & \Delta e_{max} & \Delta^2 e_{max} \\ -e_{max} & \Delta e_{max} & -\Delta^2 e_{max} \\ -e_{max} & -\Delta e_{max} & \Delta^2 e_{max} \\ -e_{max} & -\Delta e_{max} & -\Delta^2 e_{max} \end{bmatrix}.$$

Further, the initialization includes setting scalar widths ($\sigma$) of the RBF network using mean of the maximum error ($e_{max}$), the maximum first order change in error ($\Delta e_{max}$), and the maximum second order change in error ($\Delta^2 e_{max}$) as $\sigma = \|[e_{max} \, \Delta e_{max} \, \Delta^2 e_{max}]\|$.

The initialization further includes initializing an RBF network weight matrix of the RBF network by scaling an initial weight vector ($\omega'$) so that an input vector including the maximum error ($e_{max}$), the maximum first order change in error ($\Delta e_{max}$), and the maximum second order change in error ($\Delta^2 e_{max}$) multiplied by a predetermined fraction generates the maximum output increment ($\Delta o_{max}$).

The error is a difference between a predetermined set point of the closed loop system and a measured value of the process variable, the first order change in the error is a difference between the error and a previous error, and the second order change in the error is a difference between the first order change in the error and a previous first order change in the error.

The RBF network computes an output vector as $K(t) = \theta^T \phi(t)$, where $\theta$ is an RBF network weight matrix, and $\phi$ is an activation function of the RBF network. The incremental change is computed as $\Delta o(t) = K(t) \cdot x(t)$, where x comprises the input values. The RBF network weight matrix is updated using an actor critic reinforced learning model.

It is to be understood that the technical solutions are not limited in application to the details of construction and to the arrangements of the components set forth in the following description or illustrated in the drawings. The technical solutions are capable of embodiments in addition to those described and of being practiced and carried out in various ways. Also, it is to be understood that the phraseology and terminology employed herein, as well as the abstract, are for the purpose of description and should not be regarded as limiting. As such, those skilled in the art will appreciate that the conception upon which this disclosure is based may readily be utilized as a basis for the designing of other structures, methods, and systems for carrying out the several purposes of the presently described technical solutions.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
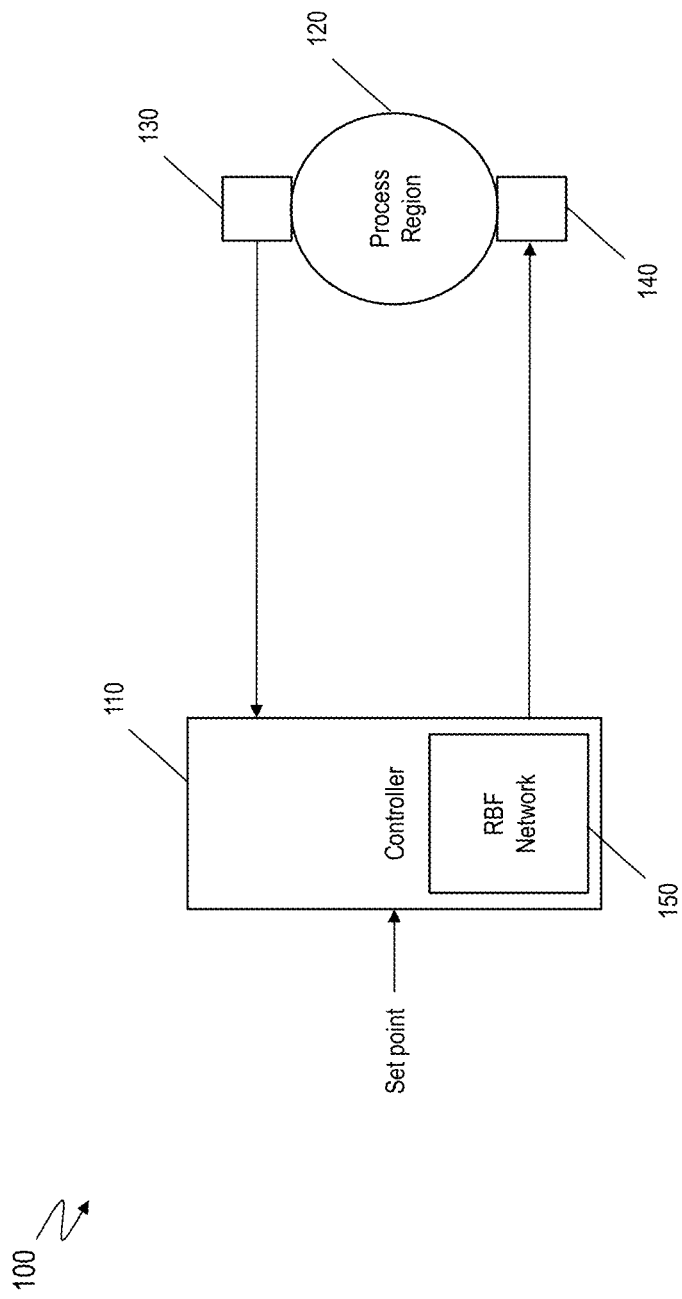
FIG. 1 depicts an example block diagram of a control system according to one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Typically, in closed loop systems, a processor controller is configured according to a predetermined formula to drive a process variable toward a particular value (the set point) and keep the process variable substantially close to that value by controlling an output. The process controller may be a proportional integral derivative (PID) controller, a proportional integral (PI) controller, or any other type of computing device that can control the one or more operations being performed in the process. There are various examples of such closed loop systems including controlling temperature (heating ventilation and air condition (HVAC) systems), flow (industrial conveyer belt drives), pressure (turbines), velocity (cruise control in vehicles), and other such process variables. Typically, the process controller becomes difficult to tune and becomes unstable as load conditions change.

To address the technical challenge of tuning and stabilizing the process controllers, artificial neural networks are used to analyze the operation of such closed loop systems based on known values of the system. For example, incremental control systems utilizing neural networks can provide more reliable control over a wider range of load conditions. However, a technical challenge with using neural networks is that they are difficult to optimize in real-time operating conditions, and thus, are difficult to implement in real-world control applications.

The technical solutions described herein address such technical challenges by facilitating a deterministic initialization of incremental neural network control systems. The control systems calculate changes in control output versus an absolute control output, based on intuitive parameters of the process being controlled, such that the control system provides stable process control from the first interval (i.e.: out of the box) over a wide range of load conditions. The initialization parameters include a maximum error, a maximum first order change in error, and a maximum second order change in error, and a maximum output increment, associated with the closed loop system being controlled. In one or more examples, the neural network may be a radial basis function neural network (RBF network).

FIG. 1 depicts an example block diagram of a control system according to one or more embodiments. The control system 100 illustrates controller 110 controlling one or more process variables for a process region 120. The process region 120 can be any application such as the control of temperature, flow, pressure, or velocity, which are the process variables being monitored and controlled by the controller 110. The controller monitors the process variable associated with the process region 120 using input from one or more sensors 130 that monitor the process variable value on a continuous or periodic basis. The controller 110 adjusts the operation of one or more output devices 140 to maintain the process variable at a preconfigured set point. For example, based on the input received from the sensors 130, the controller 110 instructs an output device 140 to generate an output that adjusts the process variable in the process region 120. The output device 140 can be a heat generating device such as a furnace, a heat reducing device such as an air cooler, a torque generator such as a motor, and the like based on the application being controlled by the controller 110.

For example, consider an example scenario of a HVAC system being controlled by the controller 110. In this case, the controller 110 controls a heating furnace and/or air cooler as the output device to adjust the temperature (process variable) in the process region 120 based on a temperature reading from a thermostat, a thermometer, or any other temperature monitoring sensor 130. Here, the region 120 can be a room, a zone in a building, or any other predetermined area for which the controller 110 maintains the temperature at the provided set point. For example, the controller 110 controls the output to maintain the desired temperature provided by the set point. The controller 110 compares feedback from the sensors 130 to the desired set point, compensates for changes in load, such as an influx of cold air, and adjusts the output devices 140 accordingly. It should be noted that, although the temperature control is used as an example herein, in other embodiments, the technical solutions described herein are applicable to any process control system 100.

The controller 110 can control just one isolated system 100 or be part of a larger, cascaded system, where one loop controls the setpoints or input variables of others. As described herein the controller 110 has to undergo tuning to maximize effectiveness. Tuning includes making dynamic real-time changes to gain, integral, and derivative values to stabilize the system 100 and increase efficiency.

As described herein, typically the controller 110 is a PID controller that operates according to a PID loop function that takes a system error (e) and returns a new controller output (o) based on one or more tuning constants $K_p$, $K_i$, and $K_d$. The typical PID loop function is of the following form:

$$o(t) = K_p e(t) + K_i \int_0^\tau e(\tau) d\tau + K_d \frac{de(t)}{dt}$$

The tuning constants are typically set at system commissioning (that is, when the control system 100 is initialized) and left unchanged through the life of the control system 100. Setting the tuning constants is a challenging task, typically involving time-consuming trial and error. If system conditions deviate from those on which the tuning was based, diminished control stability and increased system oscillation often occur.

In one or more examples, the controller 110 utilizes neural networks, such as Radial Base Function Neural Network (RBF network) 150 for incremental control of the process variable for more reliable control over a wider range of load conditions. In contrast to PID loops, which calculate the value of the output at each interval, the RBF network 150 calculates how that output should change at each interval. However, neural networks are difficult to optimize or tune in real-time operating conditions.

Hence, the technical solutions described herein facilitate the controller 110 to perform deterministic initialization of the RBF network 150. The RBF network 150 accordingly calculates changes in control output versus an absolute control output, based on intuitive parameters inherent to the process region 120 being controlled, such that the control system 100 provides stable process control from the first interval (i.e.: out of the box) over a wide range of load conditions. These parameters are as follows: the maximum error, first order change in error, and second order change in error, and the maximum output increment.

In one or more examples, the controller 110 initializes the RBF network 150 to control the process variable in the process region 120 by reinforced learning using random node centroids, widths, and weights require a significant number of iterations to learn appropriate and stable control. During initial operation of a model, the learning mechanism may require a large number of iterations to achieve stable, appropriate control. Until stable, appropriate control is achieved, the system may behave in an erratic and unpredictable way, not ideal for critical systems like building HVAC systems.

Typically, an RBF network is initialized using random values, which requires significant numbers of iterations (thousands or more) before the RBF network becomes stable. Additionally, using a reinforced learning approach of such a randomly initialized RBF network may never converge on stable control. By initializing the RBF network 150 deterministically, the controller 110 prevents both of these disadvantages and facilitates the control system 100 to be a drop in replacement for a PID based loop technology that may currently be used to control the process variable in region 120 and moreover to achieve immediate stable control.

The RBF network 150 provides a special architecture of neural networks that present advantages compared to conventional multi-layer perceptron neural networks, including simpler structures and faster learning algorithms. RBF is a feed-forward neural network model with good performance. Each node of the hidden layer has a parameter vector, called a "center vector" ($\mu$). The centers are determined by clustering the input vectors of the training set.

Figure 2:
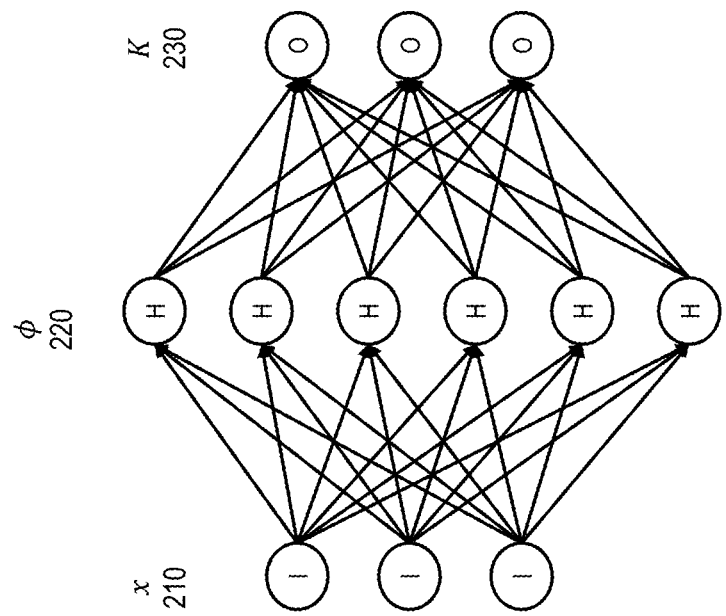
FIG. 2 depicts an example view of an RBF network topology according to one or more embodiments.
Figure 2:

FIG. 2 depicts an example view of an RBF network topology according to one or more embodiments. The RBF network 150 depicted includes three layers, an input layer 210, an RBF (hidden) layer 220, and an output layer 230; each layer including one or more nodes. The RBF network 150 provides a collection of RBF functions located in n-dimensional space, n being the number of nodes in the input layer 210. It should be noted that the RBF network 150 depicted in FIG. 2 is an example and that in other embodiments, the RBF network 150 can have a different number of layers/nodes than what is depicted.

Each node in the RBF layer 220 is assigned an RBF function. The nodes of the RBF layer 220 determine if the input received from one or more input nodes from the input layer 210 satisfy the RBF function. Based on whether the RBF function is satisfied, the output nodes from the output layer 230 generate an output that provides an increment (or decrement) in the process variable being controlled by the controller 110.

For example, for the RBF network 150 from FIG. 2, the RBF function in one or more examples is:

$$\phi j(t) = e^{-\frac{\|x(t)-\mu_j\|^2}{2\sigma_j^2}}, \text{ for } j = 1 \ldots h \text{ (Number of nodes in hidden layer)}$$

The RBF function $\phi$ is also referred to as an RBF node activation vector, in one or more examples. Here, $x(t)$ is the input received from the input layer 210 at time t and is the feature vector [e, $\Delta e$, $\Delta^2 e$]. e represents an error that computed as a difference between the monitored value from the sensor 130 and the set point. $\Delta e$ represents a change in error that is computed as a difference between a previous error ($e_{t-1}$) and the presently computed error ($e_t$); $\Delta e_t = e_t - e_{t-1}$. Further, $\Delta^2 e$ represents a change in change-in-error that is computed as a difference between a previous change in error ($\Delta e_{t-1}$) and the presently computed change in error ($\Delta e$); $\Delta^2 e_t = \Delta e_6 - \Delta e_{t-1}$. In one or more examples, the differences are computed in the other order (i.e. $V_{t-1} - V_t$).

In the above equation, $\mu$ is the RBF node center vector; a is an RBF node width scalar. The RBF center vectors ($\mu$) and the scalar widths ($\sigma$) are initialized using the predetermined feature space maximum magnitudes ([$e_{max}$, $\Delta e_{max}$, $\Delta^2 e_{max}$]). The space maximum magnitudes are specific to the control system 100 and vary according to the region 120 that is being monitored. For example, in the case of a HVAC system, the $e_{max}$ may be a maximum threshold temperature difference at which the controller 110 can adjust the temperature in the region 120. If the difference in the measured temperature value and the set point exceeds the $e_{max}$ (for example, 5 degrees, 10 degrees, etc.), the controller 110 does not adjust the temperature any further. For example, adjusting the temperature after such a difference is noted may be inefficient. Similarly, the $\Delta e_{max}$, $\Delta^2 e_{max}$ values are specific to the control system 100 to limit conditions at which the controller 110 adjusts the output device 140. It should be noted that the maximum magnitude values used in the RBF center vectors are context specific and are varied according to the situation in which the control system 100 is being used. Accordingly, the RBF node vectors are initialized as follows:

$$\mu = \begin{bmatrix} e_{max} & \Delta e_{max} & \Delta^2 e_{max} \\ e_{max} & \Delta e_{max} & -\Delta^2 e_{max} \\ e_{max} & -\Delta e_{max} & \Delta^2 e_{max} \\ e_{max} & -\Delta e_{max} & -\Delta^2 e_{max} \\ -e_{max} & \Delta e_{max} & \Delta^2 e_{max} \\ -e_{max} & \Delta e_{max} & -\Delta^2 e_{max} \\ -e_{max} & -\Delta e_{max} & \Delta^2 e_{max} \\ -e_{max} & -\Delta e_{max} & -\Delta^2 e_{max} \end{bmatrix}$$

The RBF node widths are initialized using the norm of the maximum magnitudes. For example, the width vector is initialized as follows:

$$\sigma = \|[e_{max}\ \Delta e_{max}\ \Delta^2 e_{max}]\|$$

Initializing the RBF network 150 using the above techniques results in a set of eight RBF nodes in the RBF layer 220 with centroids located at each of the maximum boundaries and scalar radial base widths, in turn, causing activations to taper off as the feature space approaches the midpoint ([0, 0, 0]). During operation of the control system 100, the values of center vectors $\mu$ and scalar widths $\sigma$ remain constant. No reinforced learning is applied to the center vectors $\mu$ or scalar widths $\sigma$.

Further, the output layer 230 of the RBF network 150 computes an output vector as $K(t) = \theta^T \phi(t)$, where $\theta$ is the RBF network weight matrix. Using the output vector, a change in the process variable (increment/decrement) is computed as $\Delta o(t) = K(t) \cdot x(t)$.

In one or more examples, the RBF network weights ($\theta$) are progressively tuned during real-time operation using an Actor-Critic reinforced learning approach (described herein). As the input feature vectors 210 settle at the provided set point (in turn driving [e, $\Delta e$, $A^2 e$]=[0, 0, 0]), the sum of node outputs 230 adds to zero yielding zero output increment (no change in output). The RBF network weights ($\theta$) are initialized to create a 'bowl' shape such that the output increment for an input vector drives the system state toward set point (at the bottom of the bowl shape). The weights are initialized by scaling an initial weight vector (ω') such that a feature vector at $\frac{1}{3}^{rd}$ the maximum magnitude produces the maximum output increment ($\Delta o_{max}$). The response of the RBF network can be reversed by changing the sign of s. A reinforced learning approach, such as an actor critic model, is used to progressively learn the network weights (θ) based on real-time model performance.

Reinforcement learning is a framework in which an agent (such as the controller 110) optimizes its behavior by interacting with the environment. In response to taking an action in based on a present state, the controller 110 receives a scalar reward from the environment, which gives the controller 110 an indication of the quality of the action taken. The function that indicates the action to take in a particular state is called a policy. The premise of the actor critic model is that the goal of the controller 110 is to find a policy that maximizes the total accumulated reward, also called the return. By following a given policy and processing the rewards, the controller 110 builds estimates of the return. The function representing this estimated return is known as a value function. Using the value function allows the controller 110 to use past experiences to decide on future actions to take in or around a particular state.

Figure 3:
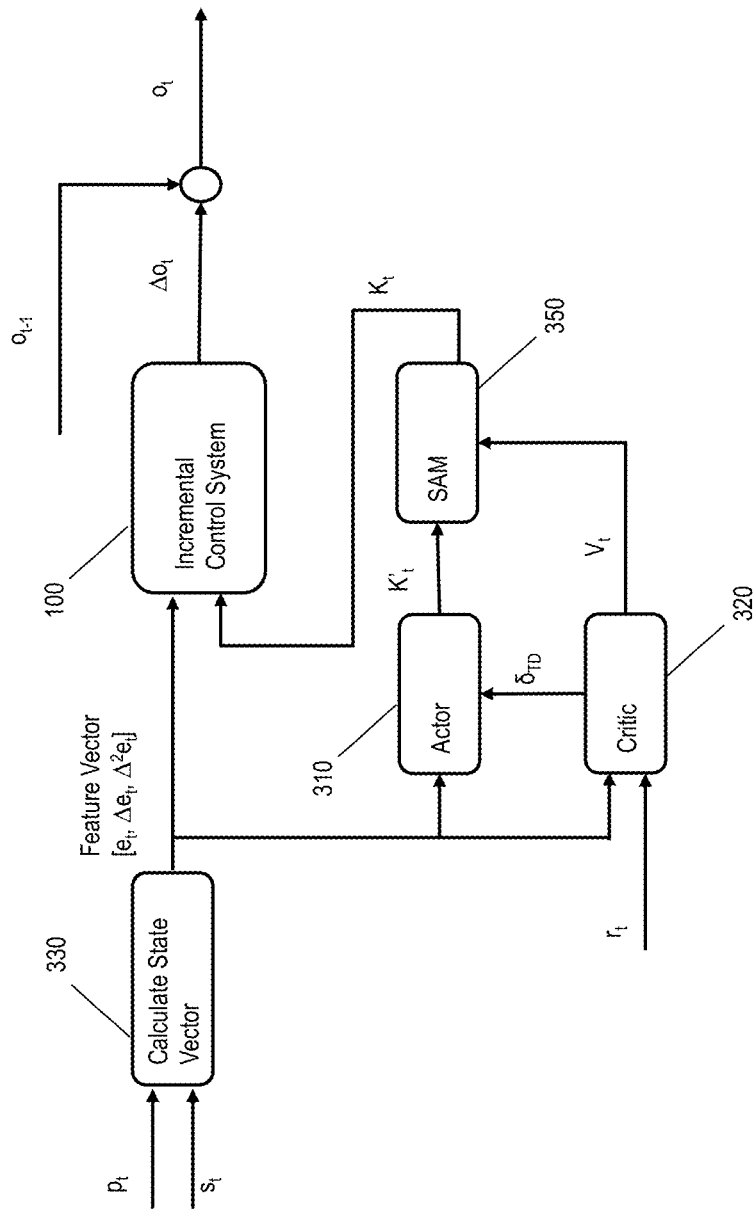
FIG. 3 depicts an operational flow diagram for an actor-critic reinforced learning for tuning the network weights according to one or more embodiments.

FIG. 3 depicts an operational flow diagram for an actor-critic reinforced learning for tuning the network weights according to one or more embodiments. In the illustration, s=Process Set Point; p=Process Value; o=Controller Output; e=Error (Set Point–Process Value). The actor critic model has two components: an actor 310, a critic 320, and a stochastic action modifier (SAM) 350. The actor 310 takes in the current environment state vector that is calculated, at 330. The actor 310 determines computes the output vector 230. The critic 320 evaluates the environment state and the action and returns the score (reward) that represents how apt the action is for the environment state.

As depicted in FIG. 3, during the computations r=Instantaneous Reward; V=Predicted Future Model Desirability; K'=Unmodified Action Vector; K=Action Vector with Stochastic Action Modification (SAM); and $\delta_{TD}$=Temporal Difference Error. The action taken by the actor 310 includes mapping from the current system state vector to the parameters K'(t)=[$K_p$(t), $K_i$(t), $K_d$(t)]. The SAM 350 generates stochastically the actual parameters K(t) according to K'(t) from the actor 310 and the estimated signal V(t) from the critic 320. The critic 320 receives the system state vector and the external reinforcement signal i.e. the reward vector r(t). Using the inputs, the critic 320 computes the $\delta_{TD}$ and V(t) signals. The output from the SAM 350 is used by the control system 100 as the updated weights (θ) to compute the output vector 230 for adjusting the process variable in the region 120. The RBF network 150 is used to implement the actor-critic model by implementing policy function learning of the actor 310 and the value function learning of the critic 320 simultaneously.

Figure 4:
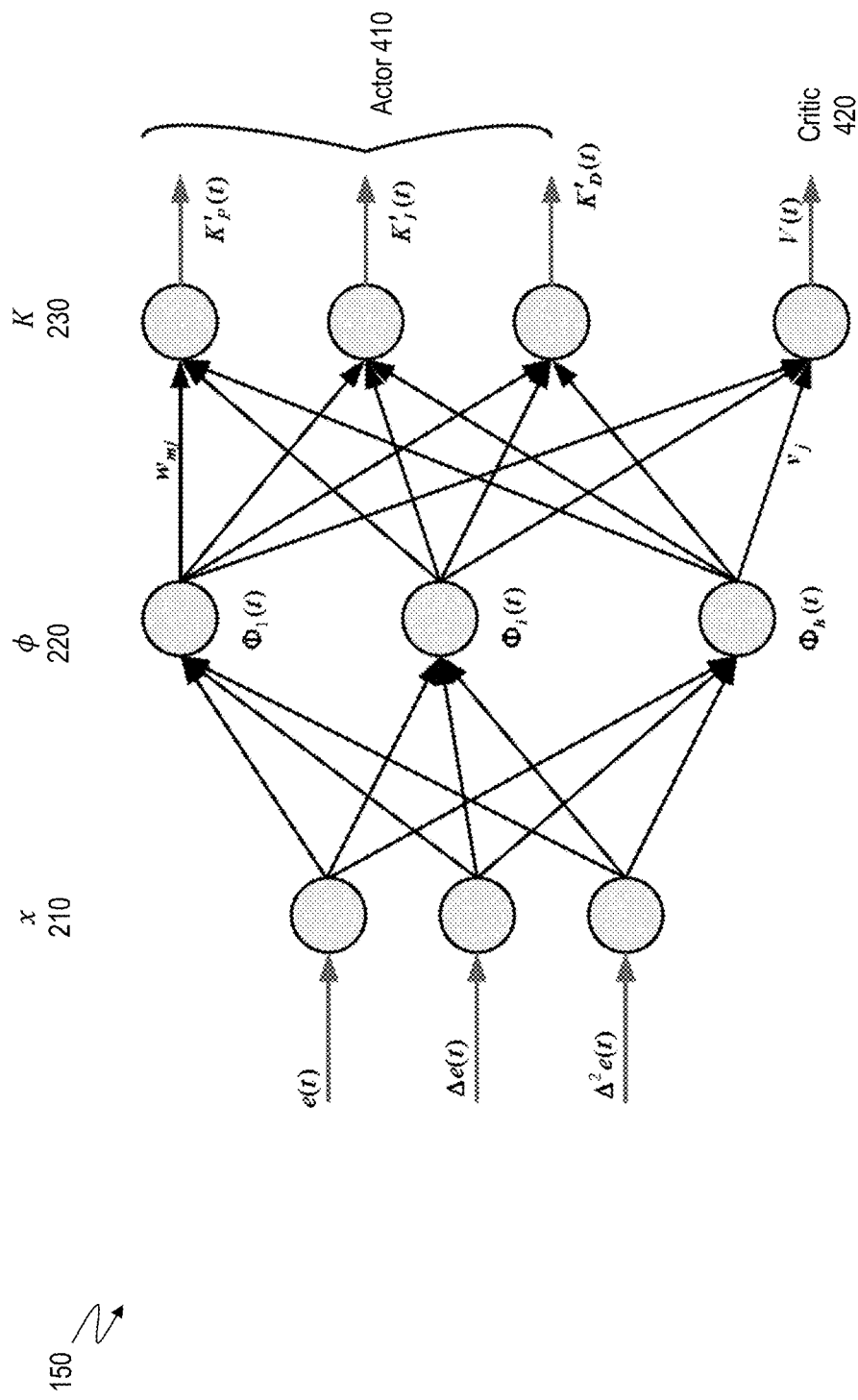
FIG. 4 depicts a mapping of the actor critic reinforced learning to an RBF network according to one or more embodiments.

FIG. 4 depicts a mapping of the actor critic reinforced learning to an RBF network according to one or more embodiments. The mapping may be performed using one or more known techniques, such as in Sedighizadeh M., Razezadeh A. (2008). Adaptive PID Controller based on Reinforcement Learning for Wind Turbine Control. *World Academy of Science, Engineering and Technology*, 37: 257-262. As depicted in FIG. 4, in this mapping, the actor 310 and the critic 320 share the input layer 210 and the hidden layer 220 of the RBF network 150. Each node in the input layer 210 denotes a system state variable x(t). Further, the kernel function of the nodes in the hidden layer 220 is the RBF activation function ϕ(t) described herein. Further yet, the output layer 230 includes an actor part 410 and a critic part 420. An output of the actor part 410 is computed as:

$$K = \omega' e^{-\frac{\left\|\left[\frac{e_{max}}{3}, \frac{\Delta e_{max}}{3}, \frac{\Delta^2 e_{max}}{3}\right] - \mu\right\|^2}{2\sigma^2}}$$

In the above calculation, as described herein, the maximum output and the maximum increment resulting from the output is capped. Further, the maximum error value that is fed to the RBF network 150 is capped.

Figure 5:
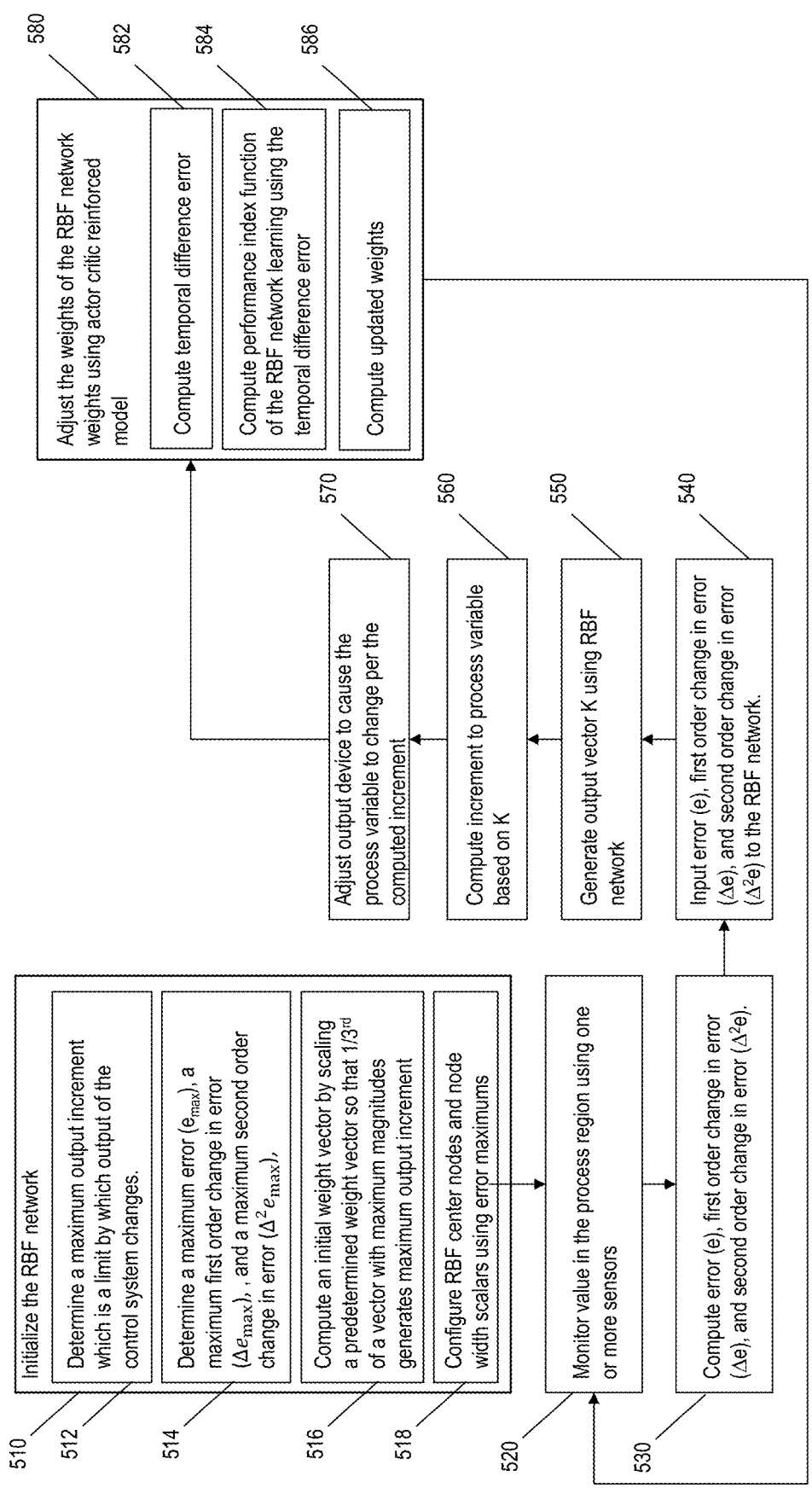
FIG. 5 depicts a flowchart of an example method for operating a control loop by using an RBF network with reinforced learning according to one or more embodiments.

FIG. 5 depicts a flowchart of an example method for operating a control loop by using an RBF network with reinforced learning according to one or more embodiments. The method includes initializing the RBF network 150, at 510. The weight initialization includes determining a value for maximum output increment ($\Delta o_{max}$) for the control system 100, at 512. In one or more examples, the maximum output increment can be a preconfigured value. Further, the initialization includes determining maximum values for the error (e), first order change in error (Δe), and second order change in error ($\Delta^2 e$), at 514. The maximum error related values may be preconfigured values. Further, the initialization of the weights includes scaling an initial weight vector (ω') so that an input vector at $\frac{1}{3}^{rd}$ of maximum magnitude generates the maximum output increment ($\Delta o_{max}$), which is a predetermined value, at 516. The computation is described above. In other examples, another predetermined fractional value such as $\frac{1}{4}^{th}$, $\frac{1}{5}^{th}$, and the like of the input vector with the maximum magnitudes (instead of $\frac{1}{3}^{rd}$ from the above example) is used to determine the initial weight matrix.

For example, using initial values of the control parameters in the vector K, a vector s for scaling an initial weight matrix (ω') is computed as:

$$s = \frac{-\Delta o_{max}}{\left[\frac{e_{max}}{3}, \frac{\Delta e_{max}}{3}, \frac{\Delta^2 e_{max}}{3}\right] \cdot K}$$

The initial vector ω' is initialized with predetermined values, for example as ω'=[1, 2, 3]. Weight values are then computed for initializing each node as ω=s ω', and the weight vector is initialized using the weight values at each node as:

$$\theta = \begin{bmatrix} \omega \\ \omega \\ \dots \\ \omega \end{bmatrix}, \text{ for } 1 \dots h \text{ (Number of hidden nodes)}$$

Further, the method includes configuring the RBF center node vectors (μ) and node width scalars (σ) using error maximums as described earlier, at 518.

The method further includes detecting the measured value from the sensors 130 for the process region 120, at 520. The method further includes computing the error (e), the first order change in error (Δe), and the second order change in error ($\Delta^2 e$), at 530. The error values are fed as input vector to the input layer 210 of the RBF network, at 540. The RBF network 150 generates an output that is the updated vector of parameters (K) based on the RBF activation function (ϕ)

as described herein, at 550. The method further includes computing an increment (Δo) to the process variable being controlled via the output device 140 based on the output vector (K), at 560. The method further includes the controller 110 adjusting the operation of the output device 140 to adjust the process variable according to the increment (Δo), at 570.

Further yet, the method includes adjusting the weights (θ) of the RBF network 150 progressively using an actor critic model, at 580. This includes computing a temporal difference error ($\delta_{TD}$) (at 582):

$$\delta_{TD}(t) = r(t) + \gamma V(t+1) - V(t)$$

Here, r(t) is the external reinforcement reward signal, and 0<γ<1 denotes the discount factor that is used to determine the proportion of the delay to the future rewards. The external reinforcement reward comes from a simple conditional, which is the cost function. If the error of the last action is less than a predetermined threshold, then the reward (or cost) is 0; if it is not, the reward (or cost) is −0.5. The reward or cost values can be different in different examples. The temporal difference error indicates a goodness of the actual action, and in one or more examples, a performance index function of the RBF network learning is further computed as follows (at 584):

$$E(t) = \tfrac{1}{2} \delta_{TD}^2(t)$$

In one or more examples, based on the temporal difference error performance index, the weights (θ) are updated according to the following equations through a gradient descent method and a chain rule, at 586. It should be noted that in other examples, the update may be performed using different techniques than the gradient descent and the chain rule.

$$\omega_{mj}(t+1) = \omega_{mj}(t) + \alpha_A \delta_{TD}(t) \frac{K_m(t) - K'_m(t)}{\sigma_V(t)} \phi_j(t)$$

$$V_j(t+1) = V_j(t) + \alpha_C \delta_{TD}(t) \phi_j(t)$$

Here, $\alpha_A$ and $\alpha_C$ are learning rates of the actor 310 and the critic 320 respectively, and where the learning rates are preconfigured values. It should be noted that, as described earlier, the center nodes and the scalar widths are not updated.

The method executes in a loop to continuously monitor and update the process variable in the region 120.

The above described method for initializing the RBF network 150 and using the actor critic based reinforced incremental learning for the RBF network facilitates elimination of initial training period of the control system 100 where model performs poorly and system control may be erratic and unpredictable. The above described techniques facilitate effective model performance from the very first iteration of the control system 100.

In one or more examples, the control system 100 controls a temperature in a room/zone of a building, which is the process region 120. The temperature may be controlled by an HVAC system (that is the output device 140) generating and pumping hot/cold air into the room. The controller 110 maybe a thermostat that receives the set point as a desired temperature in the room. Further, the thermostat sends an input command to the HVAC system for generating the hot/cold air based on a measured temperature in the room being below/above the set point.

For example, an overwhelming majority of HVAC-related PID loops are tuned at system commissioning and are not tuned again through the usable life of the device. As load conditions change, due to changes in building use or aging of the equipment, PID loops become increasingly inefficient. A survey of PID controllers across a site including multiple buildings controller by respective control systems 100 using PID loop control, identified each control system to be functioning sub-optimally, including simultaneous heating and cooling within the same space. This is akin to driving a car with one foot on the gas and controlling the speed with the brake. Such suboptimal conditions exist throughout the commercial HVAC/buildings controls sector. Accordingly, improving the low level control of HVAC systems using the technical solutions herein can achieve large savings including energy savings and reduced maintenance cost. The technical solutions thus provide an improvement to control systems, and further an improvement to computing technology used for operating a controller of the control systems. Although the embodiments herein are described using an HVAC system, the technical solutions described herein are applicable in any situation.

The technical solutions described herein are rooted in computer technology, particularly using RBF neural networks and reinforced learning frameworks such as actor critic model. Further, the technical solutions described herein are also related to closed loop control systems. The technical solutions described herein improve such computer technology by providing the one or more advantages described throughout the present disclosure by improving the performance of an incremental control system with input feature vectors based on instantaneous error and first and second order changes in error. Further, the technical solutions described herein facilitate the control system to effectively initialize the model to appropriately respond to any input within the feature space as bounded by the maximum feature magnitudes. The technical solutions accordingly facilitate the control system to provide continuous commissioning and self-corrections for varying environmental conditions whereas traditional programmed PID loops may operate erratically under various conditions.

Figure 6:
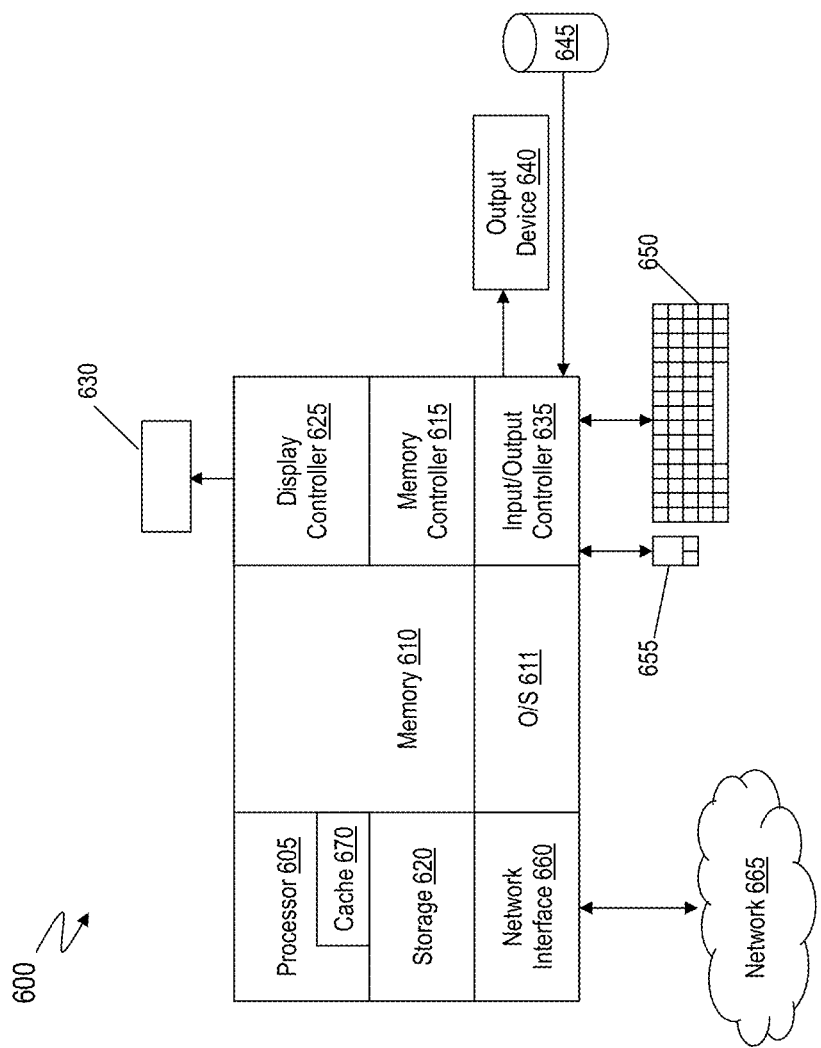
FIG. 6 depicts an example controller according to one or more embodiments.

FIG. 6 illustrates an example system 600. The system 600 is a computing device, such as a PI controller, a PID controller, and the like that can be used as the controller 110. For example, the system 600 may be a desktop computer, a tablet computer, a laptop computer, a phone, such as a smartphone, a server computer, a thermostat, or any other computing device. The system 600 includes hardware, such as electronic circuitry.

The system 600 includes, among other components, a processor 605, memory 610 coupled to a memory controller 615, and one or more input devices 645 and/or output devices 640, such as peripheral or control devices, that are communicatively coupled via a local I/O controller 635. These devices 640 and 645 may include, for example, battery sensors, position sensors, indicator/identification lights and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/ demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the system 600, a semiconductor based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, and so on).

The memory 610 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the systems and methods described herein.

The system 600 may further include a display controller 625 coupled to a user interface or display 630. In some embodiments, the display 630 may be an LCD screen. In other embodiments, the display 630 may include a plurality of LED status lights. In some embodiments, the system 600 may further include a network interface 660 for coupling to a network 665. The network 665 may be an IP-based network for communication between the system 600 and an external server, client and the like via a broadband connection. In an embodiment, the network 665 may be a satellite network. The network 665 transmits and receives data between the system 600 and external systems. In some embodiments, the network 665 may be a managed IP network administered by a service provider. The network 665 may be implemented in a wireless fashion, for example, using wireless protocols and technologies, such as WiFi, WiMax, satellite, or any other. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

The technical solutions described herein provide a system and method for initializing neural network incremental control systems utilizing the controlled system's maximum error and the maximum output increment allowed by the controller system. Accordingly, the technical solutions facilitate a process control utilizing neural network incremental control systems initialized with the maximum error values and maximum output increment. The technical solutions further facilitate initializing RBF network coefficients to enable the RBF network to be a drop in replacement for PID loop technology and achieve immediate stable control. The technical solutions further facilitate single input initialization enabling immediate stability of the drop-in replacement for PID loops that is easily configured and maintained. Further yet, the technical solutions facilitate maintaining stability over wide range of load conditions (e.g.: equipment aging, changes in how building space is utilized, and changes in weather conditions).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for adjusting a process variable using a closed loop system, the method comprising:

initializing a radial basis function neural network (RBF network), the initialization using a maximum error ($e_{max}$), a maximum first order change in error ($\Delta e_{max}$), a maximum second order change in error ($\Delta^2 e_{max}$), and a maximum output increment ($\Delta o_{max}$), associated with the closed loop system being controlled, and wherein the initialization comprises setting center vectors ($\mu$) of the RBF network using the maximum error ($e_{max}$), the maximum first order change in error ($\Delta e_{max}$), and the maximum second order change in error ($\Delta^2 e_{max}$) as:

$$\mu = \begin{bmatrix} e_{max} & \Delta e_{max} & \Delta^2 e_{max} \\ e_{max} & \Delta e_{max} & -\Delta^2 e_{max} \\ e_{max} & -\Delta e_{max} & \Delta^2 e_{max} \\ e_{max} & -\Delta e_{max} & -\Delta^2 e_{max} \\ -e_{max} & \Delta e_{max} & \Delta^2 e_{max} \\ -e_{max} & \Delta e_{max} & -\Delta^2 e_{max} \\ -e_{max} & -\Delta e_{max} & \Delta^2 e_{max} \\ -e_{max} & -\Delta e_{max} & -\Delta^2 e_{max} \end{bmatrix};$$

replacing a heating ventilation and cooling (HVAC) proportional integral differential (PID) control loop with the initialized RBF;

inputting, to the RBF network, input values comprising an error, a first order change in error, and a second order change in error, wherein the error is a difference between a predetermined set point of the closed loop system and a measured value of the process variable, the first order change in the error is a difference between the error and a previous error, and the second order change in the error is a difference between the first order change in the error and a previous first order change in the error;

computing, by the RBF network, control parameters based on the input values;

computing, by the RBF network, an incremental change in the process variable based on the control parameters; and adjusting, by a controller, an output device to change the process variable by the incremental change.

2. The computer-implemented method of claim 1, wherein the initialization comprises setting scalar widths ($\sigma$) of the RBF network using mean of the maximum error ($e_{max}$), the maximum first order change in error ($\Delta e_{max}$), and the maximum second order change in error ($\Delta^2 e_{max}$) as:

$\sigma = \|[e_{max} \, \Delta e_{max} \, \Delta^2 e_{max}]\|$.

3. The computer-implemented method of claim 1, wherein the initialization further comprises initializing an RBF network weight matrix of the RBF network by scaling an initial weight vector ($\omega'$) so that an input vector including the maximum error ($e_{max}$), the maximum first order change in error ($\Delta e_{max}$), and the maximum second order change in error ($\Delta^2 e_{max}$) multiplied by a predetermined fraction generates the maximum output increment ($\Delta o_{max}$).

4. The computer-implemented method of claim 1, wherein the RBF network computes an output vector as $K(t) = \theta^T \phi(t)$, where $\theta$ is an RBF network weight matrix, and $\phi$ is an activation function of the RBF network.

5. The computer-implemented method of claim 4, wherein the incremental change is computed as $\Delta o(t) = K(t) \cdot x(t)$, where x comprises the input values.

6. The computer-implemented method of claim 4, wherein the RBF network weight matrix is updated using an actor critic reinforced learning model.

7. A control system for controlling a process variable of a closed loop system, the control system comprising:

one or more sensors that measure the process variable;

an output device that changes the process variable based on an input command; and a controller that generates and sends the input command to the output device, generating of the input command comprises:

initializing a radial basis function neural network (RBF network), the initialization using a maximum error ($e_{max}$), a maximum first order change in error ($\Delta e_{max}$), a maximum second order change in error ($\Delta^2 e_{max}$), and a maximum output increment ($\Delta o_{max}$), associated with the closed loop system being controlled, wherein the initialization comprises setting center vectors ($\mu$) of the RBF network using the maximum error ($e_{max}$), the maximum first order change in error ($\Delta e_{max}$), and the maximum second order change in error ($\Delta^2 e_{max}$) as:

$$\mu = \begin{bmatrix} e_{max} & \Delta e_{max} & \Delta^2 e_{max} \\ e_{max} & \Delta e_{max} & -\Delta^2 e_{max} \\ e_{max} & -\Delta e_{max} & \Delta^2 e_{max} \\ e_{max} & -\Delta e_{max} & -\Delta^2 e_{max} \\ -e_{max} & \Delta e_{max} & \Delta^2 e_{max} \\ -e_{max} & \Delta e_{max} & -\Delta^2 e_{max} \\ -e_{max} & -\Delta e_{max} & \Delta^2 e_{max} \\ -e_{max} & -\Delta e_{max} & -\Delta^2 e_{max} \end{bmatrix};$$

replacing a proportional integral differential (PID) control loop with the initialized RBF;

inputting, to the RBF network, input values comprising an error, a first order change in error, and a second order change in error, wherein the error is a difference between a predetermined set point of the closed loop system and a measured value of the process variable, the first order change in the error is a difference between the error and a previous error, and the second order change in the error is a difference between the first order change in the error and a previous first order change in the error;

computing, by the RBF network, control parameters based on the input values;

computing, by the RBF network, an incremental change in the process variable based on the control parameters; and adjusting the output device to change the process variable by the incremental change.

8. The control system of claim 7, wherein the initialization comprises setting scalar widths ($\sigma$) of the RBF network using mean of the maximum error ($e_{max}$), the maximum first order change in error ($\Delta e_{max}$), and the maximum second order change in error ($\Delta^2 e_{max}$) as:

$\sigma = \|[e_{max} \, \Delta e_{max} \, \Delta^2 e_{max}]\|$.

9. The control system of claim 7, wherein the initialization further comprises initializing an RBF network weight matrix of the RBF network by scaling an initial weight vector ($\omega'$) so that an input vector including the maximum error ($e_{max}$), the maximum first order change in error ($\Delta e_{max}$), and the maximum second order change in error ($\Delta^2 e_{max}$) multiplied by a predetermined fraction generates the maximum output increment ($\Delta o_{max}$).

10. The control system of claim 7, wherein the RBF network computes an output vector as $K(t) = \theta^T \phi(t)$, where $\theta$ is an RBF network weight matrix, and $\phi$ is an activation function of the RBF network.

11. The control system of claim 10, wherein the incremental change is computed as $\Delta o(t) = K(t) \cdot x(t)$, where x comprises the input values.

12. A non-transitory computer readable storage medium for generating an input command for adjusting a process variable of a closed loop system, the non-transitory computer readable storage medium comprising a memory device with computer executable instructions therein, the instructions when executed by a processing unit generate the input command, the generation of the input command comprising:

initializing a radial basis function neural network (RBF network), the initialization using a maximum error ($e_{max}$), a maximum first order change in error ($\Delta e_{max}$), a maximum second order change in error ($\Delta^2 e_{max}$), and a maximum output increment ($\Delta o_{max}$), associated with the closed loop system being controlled, wherein the initialization comprises setting center vectors ($\mu$) of the RBF network using the maximum error ($e_{max}$), the maximum first order change in error ($\Delta e_{max}$), and the maximum second order change in error ($\Delta^2 e_{max}$) as:

$$\mu = \begin{bmatrix} e_{max} & \Delta e_{max} & \Delta^2 e_{max} \\ e_{max} & \Delta e_{max} & -\Delta^2 e_{max} \\ e_{max} & -\Delta e_{max} & \Delta^2 e_{max} \\ e_{max} & -\Delta e_{max} & -\Delta^2 e_{max} \\ -e_{max} & \Delta e_{max} & \Delta^2 e_{max} \\ -e_{max} & \Delta e_{max} & -\Delta^2 e_{max} \\ -e_{max} & -\Delta e_{max} & \Delta^2 e_{max} \\ -e_{max} & -\Delta e_{max} & -\Delta^2 e_{max} \end{bmatrix};$$

replacing a proportional integral differential (PID) control loop with the initialized RBF;

inputting, to the RBF network, input values comprising an error, a first order change in error, and a second order change in error, wherein the error is a difference between a predetermined set point of the closed loop system and a measured value of the process variable, the first order change in the error is a difference between the error and a previous error, and the second order change in the error is a difference between the first order change in the error and a previous first order change in the error;

computing, by the RBF network, control parameters based on the input values;

computing, by the RBF network, an incremental change in the process variable based on the control parameters; and adjusting an output device to change the process variable by the incremental change.

13. The non-transitory computer readable storage medium of claim 12, wherein the initialization comprises setting scalar widths ($\sigma$) of the RBF network using mean of the maximum error ($e_{max}$), the maximum first order change in error ($\Delta e_{max}$), and the maximum second order change in error ($\Delta^2 e_{max}$) as:

$\sigma = \|[e_{max}\ \Delta e_{max}\ \Delta^2 e_{max}]\|$.

14. The non-transitory computer readable storage medium of claim 12, wherein the initialization further comprises initializing an RBF network weight matrix of the RBF network by scaling an initial weight vector ($\omega'$) so that an input vector including the maximum error ($e_{max}$), the maximum first order change in error ($\Delta e_{max}$), and the maximum second order change in error ($\Delta^2 e_{max}$) multiplied by a predetermined fraction generates the maximum output increment ($\Delta o_{max}$).

15. The non-transitory computer readable storage medium of claim 12, wherein the RBF network computes an output vector as $K(t) = \theta^T \phi(t)$, where $\theta$ is an RBF network weight matrix, and $\phi$ is an activation function of the RBF network.

16. The non-transitory computer readable storage medium of claim 15, wherein the incremental change is computed as $\Delta o(t) = K(t) \cdot x(t)$, where x comprises the input values.

17. A controller configured to adjust a process variable of a closed loop system to a set point, the adjustment comprising:

initializing a radial basis function neural network (RBF network), the initialization using a maximum error ($e_{max}$), a maximum first order change in error ($\Delta e_{max}$), a maximum second order change in error ($\Delta^2 e_{max}$), and a maximum output increment ($\Delta o_{max}$), associated with the closed loop system being controlled, wherein the initialization comprises setting center vectors ($\mu$) of the RBF network using the maximum error ($e_{max}$), the maximum first order change in error ($\Delta e_{max}$), and the maximum second order change in error ($\Delta^2 e_{max}$) as:

$$\mu = \begin{bmatrix} e_{max} & \Delta e_{max} & \Delta^2 e_{max} \\ e_{max} & \Delta e_{max} & -\Delta^2 e_{max} \\ e_{max} & -\Delta e_{max} & \Delta^2 e_{max} \\ e_{max} & -\Delta e_{max} & -\Delta^2 e_{max} \\ -e_{max} & \Delta e_{max} & \Delta^2 e_{max} \\ -e_{max} & \Delta e_{max} & -\Delta^2 e_{max} \\ -e_{max} & -\Delta e_{max} & \Delta^2 e_{max} \\ -e_{max} & -\Delta e_{max} & -\Delta^2 e_{max} \end{bmatrix};$$

replacing a proportional integral differential (PID) control loop with the initialized RBF;

inputting, to the RBF network, input values comprising an error, a first order change in error, and a second order change in error, wherein the initializing further comprises initializing an RBF network weight matrix of the RBF network by scaling an initial weight vector ($\omega'$) so that an input vector including the maximum error ($e_{max}$), the maximum first order change in error ($\Delta e_{max}$), and the maximum second order change in error ($\Delta^2 e_{max}$) multiplied by a predetermined fraction generates a maximum output increment ($\Delta o_{max}$);

computing, by the RBF network, control parameters based on the input values;

computing, by the RBF network, an incremental change in the process variable based on the control parameters; and adjusting an output device to change the process variable by the incremental change.

18. The controller of claim 17, wherein the initialization comprises:

setting scalar widths ($\sigma$) of the RBF network using mean of the maximum error ($e_{max}$), the maximum first order change in error ($\Delta e_{max}$), and the maximum second order change in error ($\Delta^2 e_{max}$) as:

$\sigma = \|[e_{max}\ \Delta e_{max}\ \Delta^2 e_{max}]\|$.

19. A control system for controlling a heat ventilating and air conditioning (HVAC) system, the control system comprising:

a controller that generates and sends an input command to the HVAC system to adjust a temperature to a set point, generating and sending of the input command comprises:

initializing a radial basis function neural network (RBF network), the initialization using a maximum error ($e_{max}$), a maximum first order change in error ($\Delta e_{max}$), a maximum second order change in error ($\Delta^2 e_{max}$), and a maximum output increment ($\Delta o_{max}$), associated with the closed loop system being controlled, wherein the initialization comprises setting center vectors ($\mu$) of the RBF network using the maximum error ($e_{max}$), the maximum first order change in error ($\Delta e_{max}$), and the maximum second order change in error ($\Delta^2 e_{max}$) as:

$$\mu = \begin{bmatrix} e_{max} & \Delta e_{max} & \Delta^2 e_{max} \\ e_{max} & \Delta e_{max} & -\Delta^2 e_{max} \\ e_{max} & -\Delta e_{max} & \Delta^2 e_{max} \\ e_{max} & -\Delta e_{max} & -\Delta^2 e_{max} \\ -e_{max} & \Delta e_{max} & \Delta^2 e_{max} \\ -e_{max} & \Delta e_{max} & -\Delta^2 e_{max} \\ -e_{max} & -\Delta e_{max} & \Delta^2 e_{max} \\ -e_{max} & -\Delta e_{max} & -\Delta^2 e_{max} \end{bmatrix};$$

replacing a proportional integral differential (PID) control loop with the initialized RBF;

inputting, to the RBF network, input values comprising an error, a first order change in error, and a second order change in error, wherein the initializing further comprises:

initializing an RBF network weight matrix of the RBF network by scaling an initial weight vector ($\omega'$) so that an input vector including the maximum error ($e_{max}$), the maximum first order change in error ($\Delta e_{max}$), and the maximum second order change in error ($\Delta^2 e_{max}$) multiplied by a predetermined fraction generates a maximum output increment ($\Delta o_{max}$);

computing, by the RBF network, control parameters based on the input values;

computing, by the RBF network, an incremental change in the process variable based on the control parameters; and adjusting an output device to change the process variable by the incremental change.

20. The control system of claim 19, wherein the error is a difference between the set point of the HVAC system and a measured temperature, the first order change in the error is a difference between the error and a previous error, and the second order change in the error is a difference between the first order change in the error and a previous first order change in the error.

* * * * *